United States Patent
Ostromek

(10) Patent No.: US 6,548,805 B1
(45) Date of Patent: Apr. 15, 2003

(54) METHOD AND SYSTEM FOR DETECTING RADIATION

(75) Inventor: Timothy Everett Ostromek, Garland, TX (US)

(73) Assignee: Litton Systems, Inc., Woodland Hills, CA (US)

(*) Notice: Subject to any disclaimer, the term of this patent is extended or adjusted under 35 U.S.C. 154(b) by 0 days.

(21) Appl. No.: 09/517,238

(22) Filed: Mar. 2, 2000

(51) Int. Cl.$^7$ ................................................. H01J 5/16
(52) U.S. Cl. ........................................ 250/226; 356/419
(58) Field of Search ............................. 250/227.23, 216, 250/226, 214.1, 214 VT; 356/326, 394, 416, 419

(56) References Cited

U.S. PATENT DOCUMENTS

| | | | | |
|---|---|---|---|---|
| 3,992,110 A | * | 11/1976 | Frazer et al. | 356/419 |
| 5,206,502 A | * | 4/1993 | Gardner | 250/226 |
| 5,999,271 A | * | 12/1999 | Shih et al. | 356/419 |
| 6,088,142 A | * | 7/2000 | Cao et al. | 359/132 |
| 6,094,271 A | * | 7/2000 | Maeda | 356/394 |
| 6,120,190 A | * | 9/2000 | Leard et al. | 385/88 |
| 6,211,664 B1 | * | 4/2001 | Bonnefoy et al. | 324/102 |

* cited by examiner

*Primary Examiner*—Que T. Le
*Assistant Examiner*—Thanh X. Luu
(74) *Attorney, Agent, or Firm*—Baker Botts L.L.P.

(57) ABSTRACT

A system for detecting radiation is disclosed. The system comprises sensors (102 and 104) operable to sense input radiation and generate sets of sensor data that yield a unique wavelength for the radiation. a processing module (108) receives the sets of sensor data and determines the wavelength for the radiation from the sets of sensor data. A four-step method for detecting radiation is also disclosed. Step one provides for selecting sensors (102 and 104) that detect input radiation and generate two or more sets of sensor data that yield a unique wavelength for the radiation. Step two calls for sensing input radiation using sensors (102 and 104) to generate sets of sensor data. Step three provides for computing a wavelength from the sets of sensor data using a processing module (108). The last step calls for displaying the wavelength using a display (136).

13 Claims, 2 Drawing Sheets

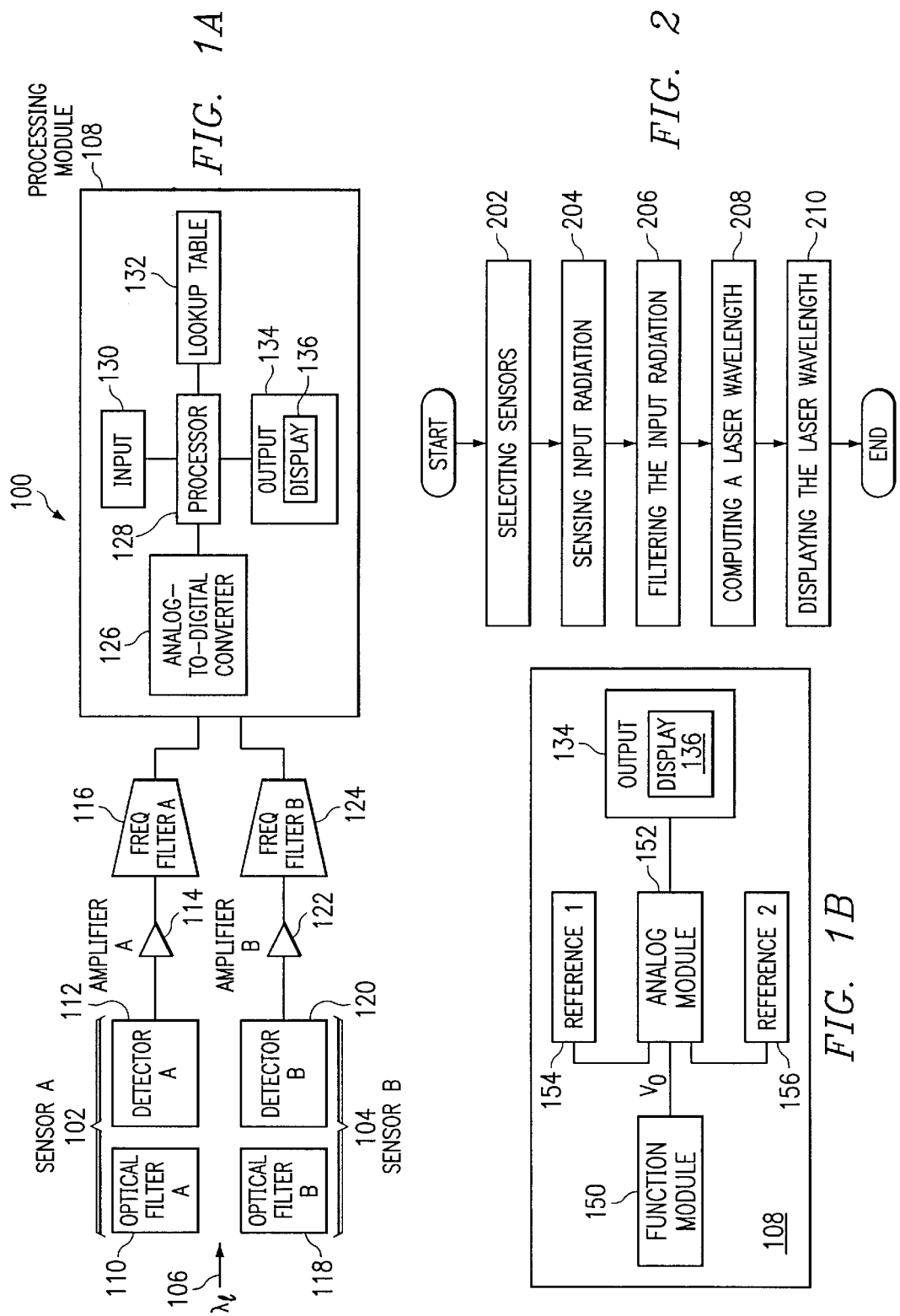

METHOD AND SYSTEM FOR DETECTING RADIATION

TECHNICAL FIELD OF THE INVENTION

This invention relates generally to the field of electro-optical systems and more specifically to a method and system for detecting radiation.

BACKGROUND OF THE INVENTION

Detecting radiation and discriminating between different radiation wavelengths have many commercial, industrial, and military applications. For example, an infantryman may need to detect laser radiation in order to determine if someone is directing a laser towards him. Moreover, the infantryman may need to discriminate between different laser wavelengths in order to determine whether the person directing the laser towards him is a friend or foe. Such applications require inexpensive, lightweight, and compact systems. Known approaches to detecting radiation, however, have not been able to produce such systems.

Known methods for detecting radiation include diffraction methods and etalon-based methods. Diffraction methods use a diffraction grating to separate input radiation by wavelength. A spectrometer is used to determine the wavelength composition of the input radiation. Etalon-based methods use a light resonator to produce resonance in the input radiation in order to determine the composition of wavelengths in the radiation. The problems with these known methods of detecting radiation are that systems using these methods are expensive and bulky, and thus not suited for many commercial, industrial, and military applications.

While these methods and systems have provided significant improvements over prior approaches, the challenges in the field of electro-optical systems have continued to increase with demands for more and better techniques allowing for compact and inexpensive systems. Therefore, a need has arisen for a new method and system for detecting radiation.

SUMMARY OF THE INVENTION

In accordance with the present invention, a method and system for detecting radiation are provided that substantially eliminate or reduce disadvantages and problems associated with previously developed systems and methods.

A system for detecting radiation is disclosed. The system comprises two or more sensors having different responsivity curves and operable to sense input radiation and to generate two or more sets of sensor data that yield a unique wavelength for the radiation. A processing module is operable to receive the sets of sensor data and to determine the wavelength from the sets of sensor data.

A four-step method for detecting radiation is also disclosed. Step one calls for selecting sensors having different responsivity curves operable to detect input radiation and generate two or more sets of sensor data that yield a unique wavelength for the radiation. Step two provides for sensing input radiation using sensors to generate sets of sensor data. Step three provides for computing a wavelength from the sets of sensor data using a processing module. The last step calls for displaying the wavelength using a display.

A technical advantage of the present invention is that it determines the radiation wavelength directly from the sensor data, which allows for quick computation of the wavelength and requires very little computing power. Another technical advantage of the present invention is that it comprises relatively few simple components to determine the radiation wavelength, resulting in an inexpensive, lightweight, and compact system.

BRIEF DESCRIPTION OF THE DRAWINGS

For a more complete understanding of the present invention and for further features and advantages, reference is now made to the following description, taken in conjunction with the accompanying drawings, in which:

FIG. 1A is a block diagram of a system that may be used in accordance with one embodiment of the present invention;

FIG. 1B is a block diagram of a processing module that may be used in the system of FIG. 1 in accordance with one embodiment of the present invention;

FIG. 2 is a flowchart demonstrating one method of detecting radiation in accordance with one embodiment of the present invention;

DETAILED DESCRIPTION OF THE DRAWINGS

Figure 3:
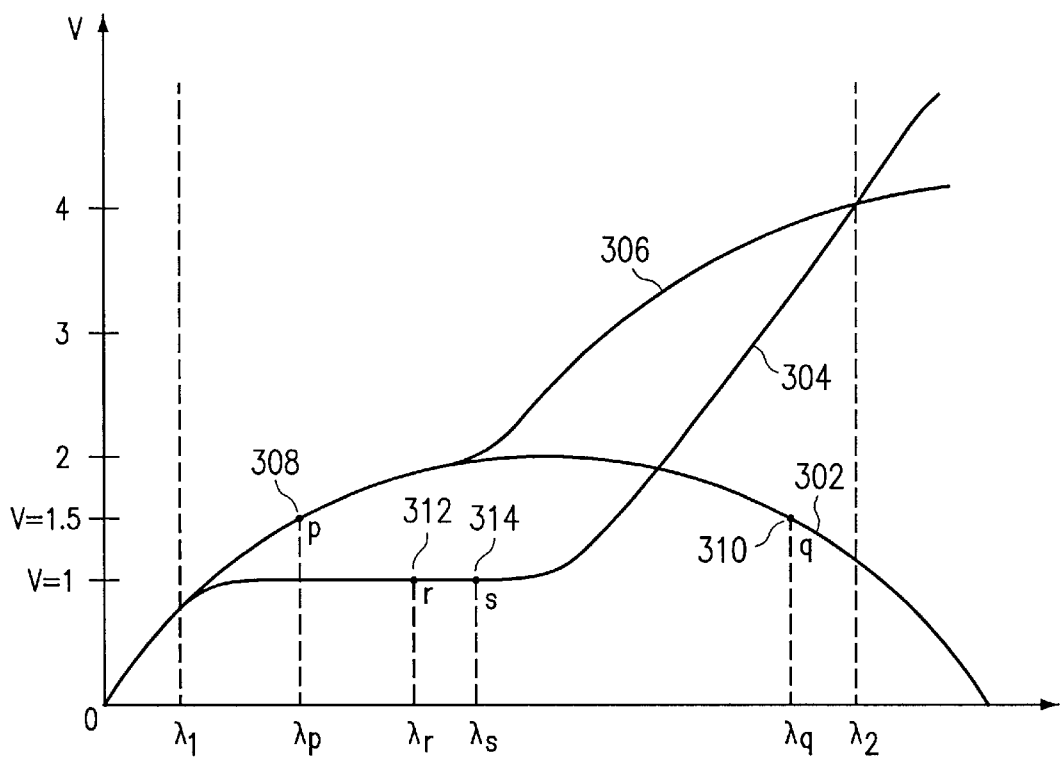
FIG. 3 is a graph of voltage output curves of sensors that may be used in the system of FIG. 1 in accordance with one embodiment of the present invention.

FIG. 1A is a block diagram of a system 100 in accordance with one embodiment of the present invention. In this embodiment, a sensor A 102 and a sensor B 104 detect input radiation 106 to generate two sets of sensor data, which are sent to a processing module 108. The processing module 108 receives the sets of sensor data and determines a wavelength for the input radiation 106. Sensor A 102 may comprise an optical filter A 110 and a detector A 112. The detector A 112 may comprise, for example, silicon. The combination of the optical filter A 110 and the detector A 112 has a specific responsivity $R_A$, which determines the voltage output $V_A$ for sensor A at a wavelength $\lambda$, as described in the following equation:

$$V_A = PR_A D_A$$

where P is the power of the input radiation and $D_A$ is the detector gain. The sensor A 102 sends the sensor data to an amplifier A 114, which amplifies the sensor data. The amplifier A 114 sends the data to a frequency filter A 116. The frequency filter A 116 may be used to enable the system to respond only to laser light with a predetermined rise time, for example, a maximum rising edge time such as for laser pulses. Sensor B 104 detects input radiation 106 in a similar manner. Sensor B 104 may comprise, for example, an optical filter B 118 and a detector B 120. The detector B 120 may comprise, for example, indium gallium arsenide. As with sensor A, the combination of the optical filter B 118 and the detector B 120 has a specific responsivity $R_B$, which determines the voltage output $V_B$ for sensor B at a wavelength $\lambda$. The sensor B 104 sends the sensor data to an amplifier B 122, which sends the data to a frequency filter B 124.

The processing module 108 receives the sensor data from sensors A 102 and B 104 and determines the wavelength of the input radiation 106. In this embodiment, the processing module 108 comprises an analog-to-digital converter 126, a processor 128, and an input 130. The analog-to-digital converter 126 converts analog sensor data to digital data to be used by the processor 128. The processor 128 processes the converted sensor data and may comprise a digital microprocessing unit. A user may interact with the processing module 108 using an input 130, for example, a keyboard or a mouse. The processing module 108 may also comprise a lookup table 132 and an output device 134. The lookup table 132 may be used to determine the range into which the wavelength of the input radiation 106 falls. The output 134 may comprise, for example, a display 136. The display 136 may be, for example, an LED that indicates the specific wavelength, or a light indicator to indicate the range into which the wavelength falls. The output 134 may also comprise a siren designed to emit a warning if the detector detects radiation with a predetermined wavelength.

FIG. 1B is a block diagram of a processing module 108 that may be used in system 100 in accordance with one embodiment of the present invention. In this embodiment, the processing module 108 comprises a function module 150, an analog module 152, a reference value 1 154, a reference value 2 156, and an output 134 comprising a display 136 coupled together as shown in FIG. 1B. The function module 150 receives sensor data from sensors A 102 and B 104 and determines a unique voltage value $V_0$, as discussed in more detail in connection with FIG. 2. The analog module 152 receives voltage value $V_0$ and compares voltage value $V_0$ to reference 1 154 voltage value $V_1$ and reference 2 156 voltage value $V_2$. The analog module 152 may comprise analog circuitry and/or logic circuitry, for example, TTL or CMOS circuits. Any number of reference values may be used, and any suitable relationship may be used to designate a specific notification on output 134, for example:

$V_0 < V_1$ trigger a green light;
$V_1 \leq V_0 \leq V_2$ triggers an amber light; and
$V_0 > V_2$ triggers a red light.

The analog module 152 may also comprise a scaling amplifier that outputs a wavelength. The display 136 may be an analog meter or an LED bar that displays the wavelength.

FIG. 2 is a flowchart demonstrating one method of detecting radiation in accordance with one embodiment of the present invention. The method begins with step 202, where two or more sensors are selected. The sensors 102 and 104 may be selected such that a unique wavelength may be determined from a function $f$ of the sets of sensor data for a specified wavelength interval of interest $[\lambda_1, \lambda_2]$. The sensors 102 and 104 may be selected to have different responsivity curves, which is the responsivity of the sensor as a function of wavelength. The sensor 102 may comprise an optical filter 110 and a detector 112. The optical filter 110 and the detector 112 form a sensor 102 with a specific responsivity R and corresponding voltage V. Suppose, for example, that two sensors, sensor A 102 and sensor B 104, are selected. In step 204, input radiation 106 is sensed by sensor A 102 and sensor B 104 to generate two sets of sensor data. The sensor data may be expressed in volts, for example, $V_A$ is the voltage output of sensor A 102, and $V_B$ is the voltage output of sensor B 104, which are discussed in more detail in connection with FIG. 3. An amplifier may be used to amplify the sensor output, for example, an amplifier A 114 amplifies the signal from sensor A 102, and an amplifier B 122 amplifies the signal from sensor B 104. In step 206, the amplified signal is filtered by a frequency filter 116. The frequency filter 116 may filter the input radiation to allow only radiation with a predetermined rise time, for example, a maximum rising edge time such as with a laser pulse. The frequency filter A 116 may be used to filter the signal from sensor A 102, and a frequency filter B 124 may be used to filter the signal from sensor B 104.

The method then proceeds to step 208, where a wavelength is determined from the sets of sensor data. A processing module 108 receives sensor data from frequency filters A 116 and B 124. An analog-to-digital converter 126 may convert the sensor data to digital data. The processing module 108 determines the wavelength λ from, for example, the voltage output $V_A$ and $V_B$ from the two sensors, and may use, for example, the following function:

$f(V_A, V_B) = V_A \cdot V_B$

An illustration of function f is shown in FIG. 3. Note that function f produces a unique result for the wavelengths within the specified interval of interest $[\lambda_1, \lambda_2]$. Other suitable functions may be used, for example:

$f(V_A, V_B) = V_A - V_B$

A lookup table 132 may be used to compare wavelengths in order to compute a wavelength range into which the computed wavelength falls. In step 210, the wavelength is displayed using a display 136. The display 136 may use, for example, an LED to display the numerical value of the wavelength. Alternatively, the display 136 may display the range into which the wavelength falls using, for example, a light designated for that range. Alternatively, the display 136 may comprise an analog meter or a siren. The foregoing steps may be performed automatically using a processing module 108.

FIG. 3 is a graph of voltage output curves 302 and 304 of sensors 102 and 104, respectively, that may be used in accordance with one embodiment of the present invention. The sensors have different responsivity curves, yielding different voltage output curves 302 and 304. The responsivities $R_A$ and $R_D$ may be combined to make $f(V_A, V_B)$ 306 unique for all $\lambda_i$ in $[\lambda_1, \lambda_2]$. Many combinations of $R_A$ and $R_D$ may be used to produce this result. The voltage output curve 302 for sensor A 102 is the voltage output $V_A$ expressed as a function of wavelength. Similarly, the voltage output curve 304 for sensor B 104 is the voltage output $V_B$ expressed as a function of wavelength. Note that the voltage output curve 302 for sensor A 102 does not yield unique wavelengths for the interval $[\lambda_1, \lambda_2]$. Voltage V=1.5, shown by points p 308 and q 310 on curve 302, correspond to wavelengths $\lambda_p$ and $\lambda_q$. Similarly, the voltage output curve 304 for sensor B 104 does not yield unique wavelengths for the interval $[\lambda_1, \lambda_2]$. Voltage V=1, shown by points r 312 and s 314 on curve 304, correspond to wavelengths $\lambda_r$ and $\lambda_s$. In contrast, $f(V_A, V_B)$ yields unique values for all $\lambda_i$ in $[\lambda_1, \lambda_2]$.

Figure 4:
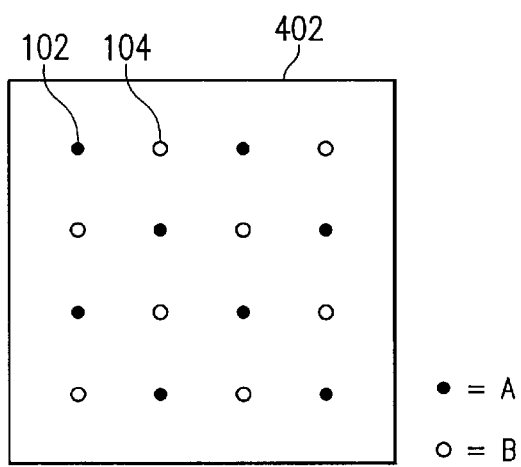
FIG. 4 is a block diagram of a sensor array that may be used in the system of FIG. 1A in accordance with one embodiment of the present invention.

FIG. 4 is a block diagram of a sensor array 402 that may be used in system 100 of FIG. 1A in accordance with one embodiment of the present invention. Sensor A 102 may comprise a plurality of individual sensors with responsivity $R_A$, and sensor B 104 may comprise a plurality of individual sensors with responsivity $R_B$. The individual sensors of sensor A 102 and of sensor B 104 may be situated in an alternating pattern on the sensor array 402 to improve the uniformity of the radiation received by the sensors. When incident radiation is reaches the sensor array 402, sensor A 102 and sensor B may each receive a fixed portion of the incident radiation. An optical diffuser may be used to diffuse incoming radiation before the radiation reaches the sensor array 402 to improve the uniformity of the radiation received by the sensors.

Although an embodiment of the invention and its advantages are described in detail, a person skilled in the art could make various alternations, additions, and omissions without departing from the spirit and scope of the present invention as defined by the appended claims.

What is claimed is:

1. A system for detecting radiation, the system comprising:
   a. two or more sensors operable to sense input radiation having a unique wavelength and to generate two or more sets of sensor data, each sensor comprising a detector and a filter, each filter associated with at most one detector;
   b. each sensor operable to sense radiation within a substantially similar wavelength range, each sensor having a different responsivity curve, a function of the responsivity curves yielding a combined function of the sets of sensor data;
   c. a processing module operable to receive the sets of sensor data and to determine the unique wavelength for the input radiation that is sensed by the sensors from the sets of sensor data according to the combined function, the unique wavelength determined by inputting the sets of sensor data into the combined function to yield an output corresponding to the unique wavelength; and
   d. a display operable to display the unique wavelength.

2. The system of claim 1, wherein each sensor comprises a plurality of individual sensors, the individual sensors forming a sensor array.

3. The system of claim 1, further comprising at least one frequency filter operable to filter the sensor data for a predetermined rise time.

4. The system of claim 1, wherein the processing module comprises an analog module operable to determine the wavelength.

5. The system of claim 1, wherein the processing module comprises a digital microprocessing unit operable to determine the wavelength.

6. The system of claim 1, wherein the processing module comprises a display operable to display the wavelength.

7. A method for detecting radiation, the method comprising:
   a. selecting two or more sensors operable to detect input radiation having a unique wavelength and to yield two or more sets of sensor data, each sensor comprising a detector and a filter, each filter associated with at most one detector;
   b. each sensor operable to sense radiation within a substantially similar wavelength range, each sensor having a different responsivity curve, a function of the responsivity curves yielding a combined function of the sets of sensor data;
   c. sensing the input radiation having a unique wavelength using the sensors in order to generate the sets of sensor data;
   d. computing the unique wavelength for the input radiation that is sensed using the sensors from the sets of sensor data according to the combined function, the unique wavelength computed by inputting the sets of sensor data into the combined function to yield an output corresponding to the unique wavelength; and
   e. displaying the wavelength.

8. The method of claim 7, wherein the selecting step further comprises selecting the sensors, each sensor comprising a plurality of individual sensors, the individual sensors forming a sensor array.

9. The method of claim 7, further comprising diffusing the radiation to be sensed by the sensors.

10. The method of claim 7, further comprising filtering the sensor data for a predetermined rise time.

11. The method of claim 7, wherein the sets of sensor data comprise two or more voltage outputs from the sensors.

12. The method of claim 11, wherein the computing step further comprises computing the wavelength using a function of the voltage outputs.

13. The method of claim 7, wherein the foregoing steps are performed automatically using a processing module.

* * * * *

UNITED STATES PATENT AND TRADEMARK OFFICE
CERTIFICATE OF CORRECTION

PATENT NO.     : 6,548,805 B1
DATED          : April 15, 2003
INVENTOR(S)    : Timothy Everett Ostromek It is certified that error appears in the above-identified patent and that said Letters Patent is hereby corrected as shown below:

<u>Title page,</u>
Item [54] Title, after "SYSTEM FOR" delete "DETECTING RADIATION" and insert -- DETERMINING A WAVELENGTH --.

Signed and Sealed this

Twenty-eighth Day of October, 2003

JAMES E. ROGAN
*Director of the United States Patent and Trademark Office*